(12) United States Patent
Nakagawa

(10) Patent No.: US 7,743,426 B2
(45) Date of Patent: Jun. 22, 2010

(54) INFORMATION DATA AND MANAGEMENT DATA PROCESSING APPARATUS AND METHOD

(75) Inventor: Toshiyuki Nakagawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1130 days.

(21) Appl. No.: 11/151,436

(22) Filed: Jun. 14, 2005

(65) Prior Publication Data

US 2005/0244004 A1    Nov. 3, 2005

Related U.S. Application Data

(62) Division of application No. 09/537,291, filed on Mar. 29, 2000, now Pat. No. 6,931,541.

(30) Foreign Application Priority Data

Mar. 31, 1999 (JP) ................. 11-091562

(51) Int. Cl.
*G06F 7/04* (2006.01)

(52) U.S. Cl. .................. 726/30; 726/26; 713/193; 380/201

(58) Field of Classification Search .............. None
See application file for complete search history.

(56) References Cited

U.S. PATENT DOCUMENTS

| | | | | |
|---|---|---|---|---|
| 5,745,879 A * | 4/1998 | Wyman | ................ | 705/1 |
| 5,987,459 A * | 11/1999 | Swanson et al. | ................ | 707/6 |
| 6,092,107 A | 7/2000 | Eleftheriadis et al. | ........ | 709/217 |
| 6,226,387 B1 | 5/2001 | Tewfik et al. | ................ | 382/100 |
| 6,335,768 B1 | 1/2002 | Reinold et al. | ............... | 348/723 |
| 6,477,649 B2 * | 11/2002 | Kambayashi et al. | ......... | 726/27 |
| 6,535,919 B1 * | 3/2003 | Inoue et al. | ................ | 709/229 |
| 6,643,330 B1 * | 11/2003 | Nakagawa et al. | ..... | 375/240.28 |
| 6,763,071 B1 * | 7/2004 | Maeda et al. | ........ | 375/240.25 |
| 6,895,555 B1 * | 5/2005 | Ando | ................ | 715/719 |
| 7,042,947 B1 * | 5/2006 | Yamamoto | ............ | 375/240.25 |
| 2002/0007452 A1 * | 1/2002 | Traw et al. | ............... | 713/152 |

(Continued)

FOREIGN PATENT DOCUMENTS

EP          0 853 429          7/1998

(Continued)

OTHER PUBLICATIONS

H. Leopold et al., Watermarking in the Mpeg-4 Context, ECMAST'99, LNCS 1629, pp. 472-492, 1999, Springer-Verlag Berlin Heidelberg 1999.*

(Continued)

*Primary Examiner*—William R Korzuch
*Assistant Examiner*—Michael R Vaughan
(74) *Attorney, Agent, or Firm*—Fitzpatrick, Cella, Harper & Scinto

(57) ABSTRACT

There is provided an information processing method/apparatus for demultiplexing object streams from a datastream which includes a plurality of object streams each having predetermined information, and decoding, synthesizing, and outputting the object streams, wherein the object streams are authenticated, and whether or not the playback control of a predetermined object stream is done before or after decoding of the predetermined object stream is determined in accordance with the method and result of authentication.

3 Claims, 5 Drawing Sheets

U.S. PATENT DOCUMENTS

| | | |
|---|---|---|
| 2002/0007456 A1* | 1/2002 | Peinado et al. .............. 713/164 |
| 2004/0107356 A1* | 6/2004 | Shamoon et al. ............ 713/193 |
| 2008/0013724 A1* | 1/2008 | Shamoon et al. ............ 380/201 |
| 2008/0276089 A1* | 11/2008 | Tian ........................... 713/168 |

FOREIGN PATENT DOCUMENTS

| | | |
|---|---|---|
| EP | 0 901 124 | 3/1999 |
| JP | 10-295937 | 11/1998 |
| WO | 97/43853 | 11/1997 |
| WO | 99/11064 | 3/1999 |

OTHER PUBLICATIONS

Lacy, et al., "Coding of Moving Picture and Audio", ISO/IEC JTC1/SC29/WG11/N2614, MPEG98, Dec. 1998.

* cited by examiner

INFORMATION DATA AND MANAGEMENT DATA PROCESSING APPARATUS AND METHOD

RELATED APPLICATION

This application is a divisional of application Ser. No. 09/537,291, filed Mar. 29, 2000, now U.S. Pat. No. 6,931,541, issued on Aug. 16, 2005, the entire contents of which are incorporated herein by reference.

BACKGROUND OF THE INVENTION

1. Field of the Invention

The present invention relates to an information processing apparatus and method and, more particularly, to an information process for protecting the intellectual property right of input data.

2. Related Background Art

In recent years, as a method of transmitting a single bitstream by combining multimedia data containing a plurality of objects such as motion image data, audio data, and the like, so-called MPEG-4 (Moving Picture Experts Group Phase 4) is standardized. The receiver (player) of MPEG-4 plays back, e.g., motion image scenes in association with audio data. In such MPEG-4 player, various use limits must be imposed on some or all data to attain copyright protection and the like.

The aforementioned MPEG-4 datastream has a function of independently transmitting/receiving many video scenes and video objects on a single stream unlike in a conventional multimedia stream. As for audio data, many objects can be similarly restored from a single stream. That is, the MPEG-4 data stream contains BIFS (Binary Format for Scenes) that modifies VRML (Virtual Reality Modeling Language) as information for synthesizing these scenes. Note that BIFS is information that describes MPEG-4 scenes using binary data.

Since individual objects required for synthesizing scenes are transmitted after they individually undergo optimal coding, they are also individually decoded by the decoder, and scenes are synthesized and played back by synchronizing the time axes of individual data with that used in the player in accordance with the description in BIFS.

In this manner, since the MPEG-4 player synthesizes a plurality of objects, use limits based on the alleged copyright must be imposed on these objects. For this purpose, a system for obtaining authentication information pertaining to the use of copyrighted information in units of objects is proposed.

In general, in order to realize copyright protection, the transmitter must execute a process for encrypting data to be transmitted or embedding copyright information as a digital watermark in data to be transmitted.

The receiver, i.e., the player acquires information for decrypting (decoding) the encrypted data, or information required for authenticating the digital watermark when the user has paid a given fee for the copyrighted information, and decodes and plays back the data that have undergone the aforementioned process, and contain desired motion image data and audio data. Upon decrypting the encrypted data or authentication using the digital watermark, copyright protection is assured by limiting the number of times of copying of data or inhibiting a given object from being edited with other objects.

In this manner, the receiver decodes and plays back the received multimedia data after decryption or authentication using the digital watermark.

However, when copyright information is embedded as a digital watermark in multimedia data to protect the copyright, that copyright information embedded in the multimedia data cannot be extracted until the multimedia data is decoded.

Decryption can be done before the multimedia data is decoded. However, authentication of the digital watermark can be done only after the multimedia data is decoded. For this reason, the playback control of multimedia data protected by the copyright information must be able to cope with encryption or digital watermarking.

SUMMARY OF THE INVENTION

Under the circumstances, it is an object of the present invention to provide an information processing apparatus and method which can reliably control playback of information data to protect the intellectual property right involved even when the intellectual property information has undergone an encryption process or the intellectual property information is embedded in the information data as a digital watermark to protect the intellectual property right.

In order to achieve the above object, an information processing method/apparatus according to one preferred embodiment of the present invention is an information processing method/apparatus for demultiplexing object streams from a datastream which includes a plurality of object streams each having predetermined information, and decoding, synthesizing, and outputting the object streams, wherein the object streams are authenticated, and whether or not the playback control of a predetermined object stream is done before or after decoding of the predetermined object stream is determined in accordance with an authentication method and the authentication result.

Also, an information processing method/apparatus according to another preferred embodiment of the present invention is an information processing method/apparatus for demultiplexing object streams from a datastream which includes a plurality of object streams each having predetermined information, scene description information for synthesizing information contained in the plurality of object streams, and management information for managing a copyright of the information, playing back each information, and synthesizing and outputting the information on the basis of the scene description information, wherein at least one object stream is authenticated on the basis of the management information, and whether the playback control of the object stream is done before or after decoding of the object stream is determined in accordance with an authentication method and the authentication result.

Furthermore, an information processing method/apparatus according to another preferred embodiment of the present invention is an information processing method/apparatus wherein encoded information data, and management data used to protect an intellectual property right of the information data are input, an authentication method for the information data is discriminated on the basis of the management data, and whether the playback control of the encoded information data is done before or after decoding of the information data is controlled in accordance with a discrimination result of the discrimination step.

Other objects, features and advantages of the invention will become apparent from the following detailed description taken in conjunction with the accompanying drawings.

DETAILED DESCRIPTION OF THE PREFERRED EMBODIMENTS

The preferred embodiment of the present invention will be described in detail hereinafter with reference to the accompanying drawings.

Figure 1:
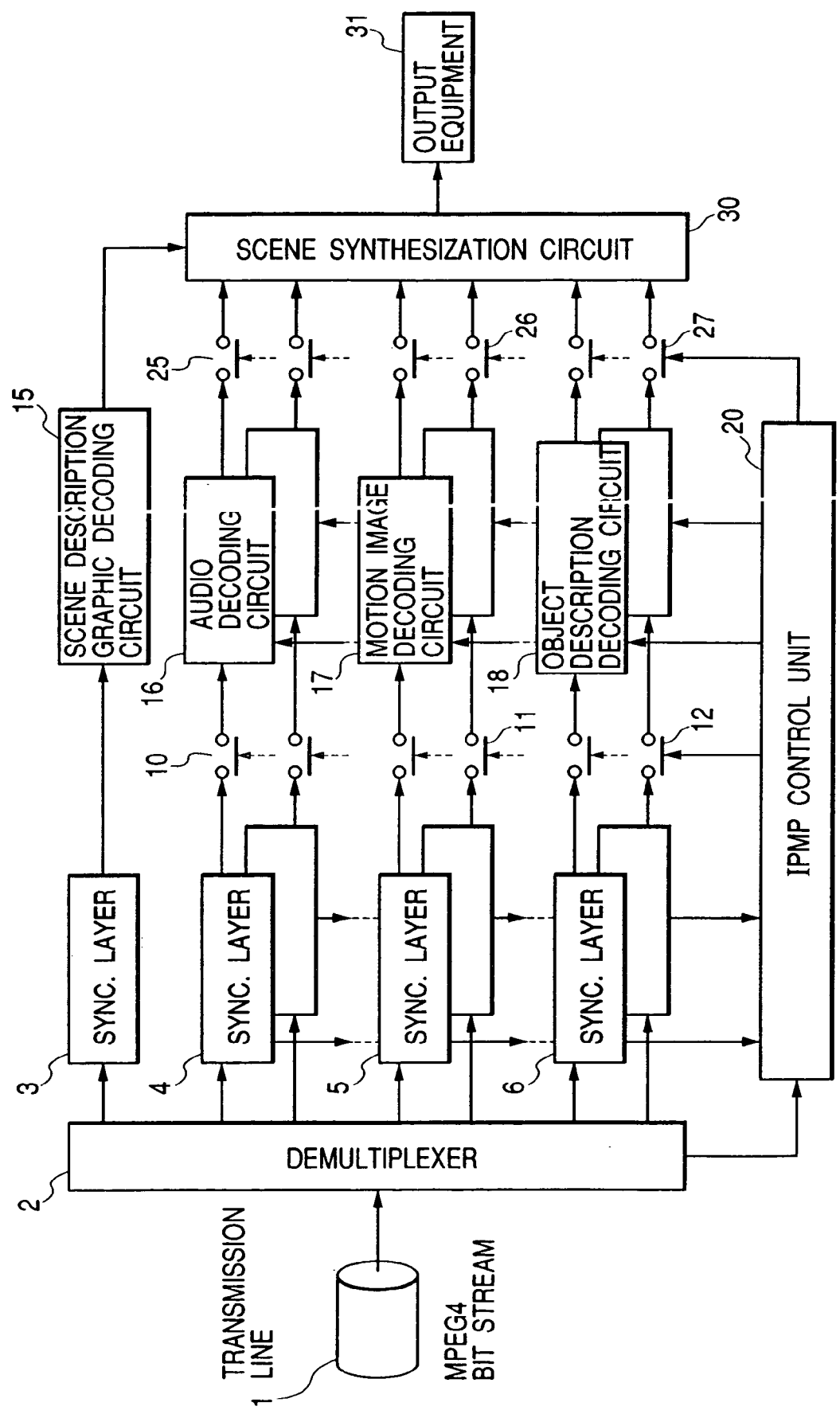
FIG. 1 is a block diagram showing the arrangement of the overall information processing apparatus according to an embodiment of the present invention.

FIG. 1 is a schematic block diagram showing the arrangement of an MPEG-4 player according to an embodiment of the present invention.

Referring to FIG. 1, a transmission line 1 is represented by various networks, and is a network on which an MPEG-4 bitstream is distributed in this embodiment. Note that the transmission line of this embodiment includes, e.g., a storage medium itself such as a magnetic tape, hard disk, DVD-RAM, or the like in addition to a so-called communication line.

In the apparatus of this embodiment, upon receiving an MPEG-4 bitstream distributed from the network or played back from the storage medium, the received MPEG-4 bitstream is input to a demultiplexer 2. The demultiplexer 2 demultiplexes the received MPEG-4 bitstream into scene description data including graphic data, audio object data, motion image object data, object description data, and the like, which are respectively input to sync. layer processing circuits 3 to 6.

Note that the audio object data has undergone high-efficiency (compression) coding such as known CELP (Code Excited Linear Prediction) coding, TWINVQ (Transform domain Weighted INterleave Vector Quantization) coding, or the like. The motion object data has undergone high-efficiency coding by, e.g., known MPEG-2, H.263, or the like. Also, the object description data contains, e.g., animation, or the like, and is similarly encoded in a format suitable for each description data.

Since the scene description data including graphic data, audio object data, motion image object data, object description data, and the like, which are synchronized by the sync. layer processing circuits 3 to 6 in accordance with time information called a time stamp appended to the bitstream, have undergone coding such as high-efficiency (compression) coding, and the like, as described above, they are decoded by decoding circuits 15 to 18 in units of objects.

Since this embodiment assumes an apparatus capable of decoding even when an MPEG-4 bitstream contains objects of two different types for each of audio object, motion image object and object description data, two sync. layer processing circuits and two decoding circuits are prepared in correspondence with the audio objects, motion image objects, and object description data.

The audio object, motion image object and object description data that have been decoded by the decoding circuits 16, 17, and 18 are supplied to a scene synthesization circuit 30, and a scene is played back and the graphic data is processed on the basis of the scene description information decoded by the decoding circuit 15. A final multimedia data sequence obtained in this manner is supplied to an output equipment 31 represented by a display, printer, or the like, and is visualized.

The received datastream in this embodiment is appended with IPMP (Intellectual Property Management and Protection) information described in, e.g., Japanese Patent Application No. 10-295937 proposed previously, assuming that control for stopping or restarting playback of individual audio or motion image objects that form each scene is required for, e.g., copyright protection.

In the apparatus of this embodiment, the IPMP information is extracted by the demultiplexer 2, and is supplied to an IPMP control unit 20. The IPMP control unit 20 cuts off a bitstream or accesses the decoding circuits 16 to 18 at access points 10, 11, and 12, or 25, 26, and 27 in FIG. 1 to stop their operations, as needed. In this manner, even when a bitstream including contents that require copyright protection is input, it can be prevented from being played back normally.

Figure 2:
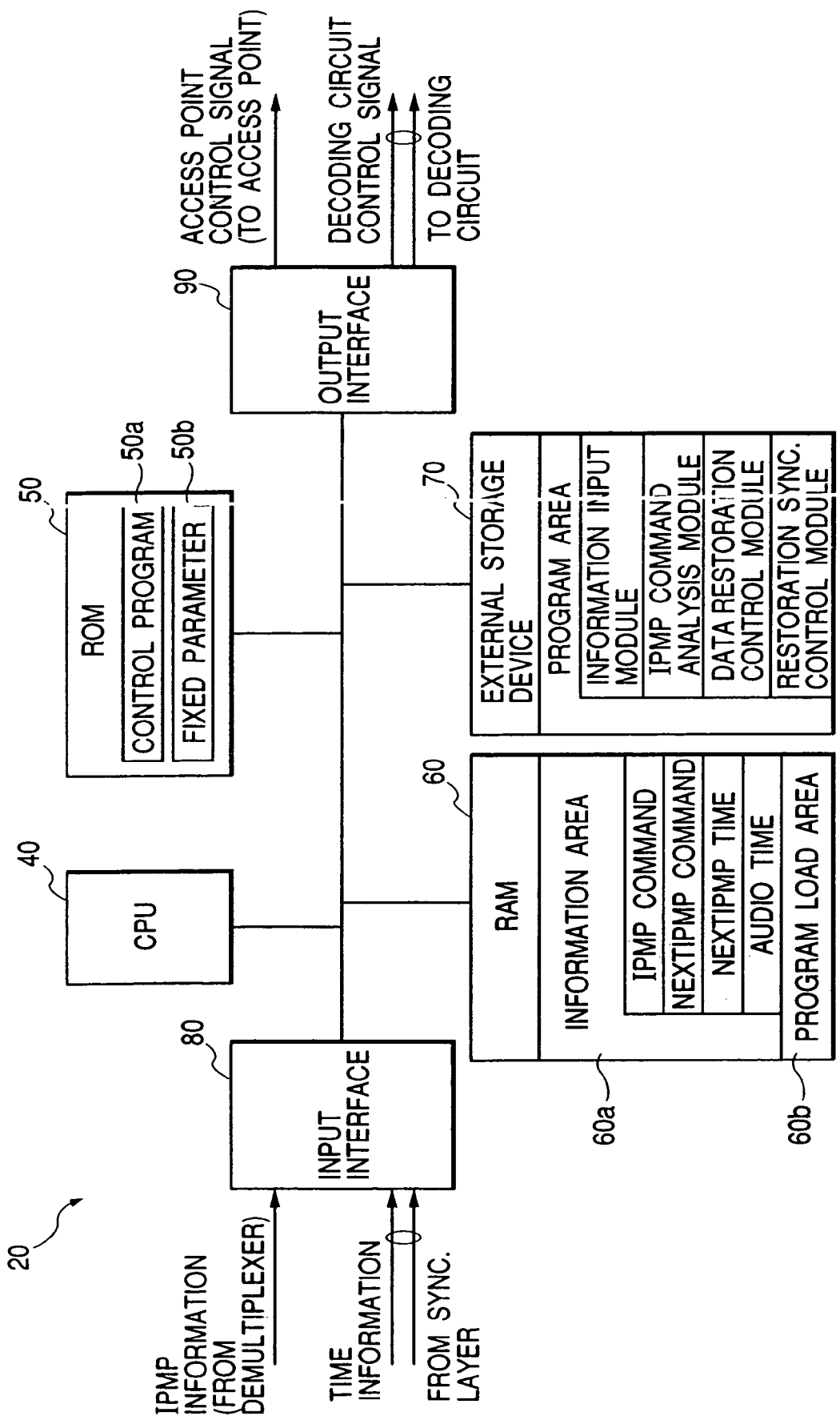
FIG. 2 is a block diagram showing the arrangement of an IPMP control unit 20 according to the embodiment of the present invention.

FIG. 2 is a block diagram showing an example of the arrangement of the IPMP control unit 20 shown in FIG. 1.

Referring to FIG. 2, a CPU 40 for arithmetic operation/control controls the IPMP control unit 20. A ROM 50 stores a permanent or fixed control program 50a, fixed parameters 50b, and the like. A RAM 60 is used as a temporary storage of the CPU 40, and includes an information area 60a for storing information such as command data, time data, and the like, and a program load area 60b for storing programs loaded from an external storage device 70. The external storage device 70 comprises an external storage medium such as a floppy disk, CD-ROM, or the like, and stores programs to be loaded onto the program load area 60b.

An input interface 80 receives IPMP information from the demultiplexer 2 and time information from the sync. layer processing circuits 4 to 6. An output interface 90 outputs an access point control signal to the access points 10 to 12, and a decoding circuit control signal to the decoding circuits 16 to 18.

In this embodiment, the IPMP control unit 20 is depicted as an independent processor element. Alternatively, some or all functions of the MPEG-4 player may be controlled by the CPU 40 or may be implemented by software, as is known to those who are skilled in the art.

The operation of the MPEG-4 player according to this embodiment, especially, operation using IPMP information, will be described in detail below with reference to the flow charts shown in FIGS. 3 and 4.

Figure 3:
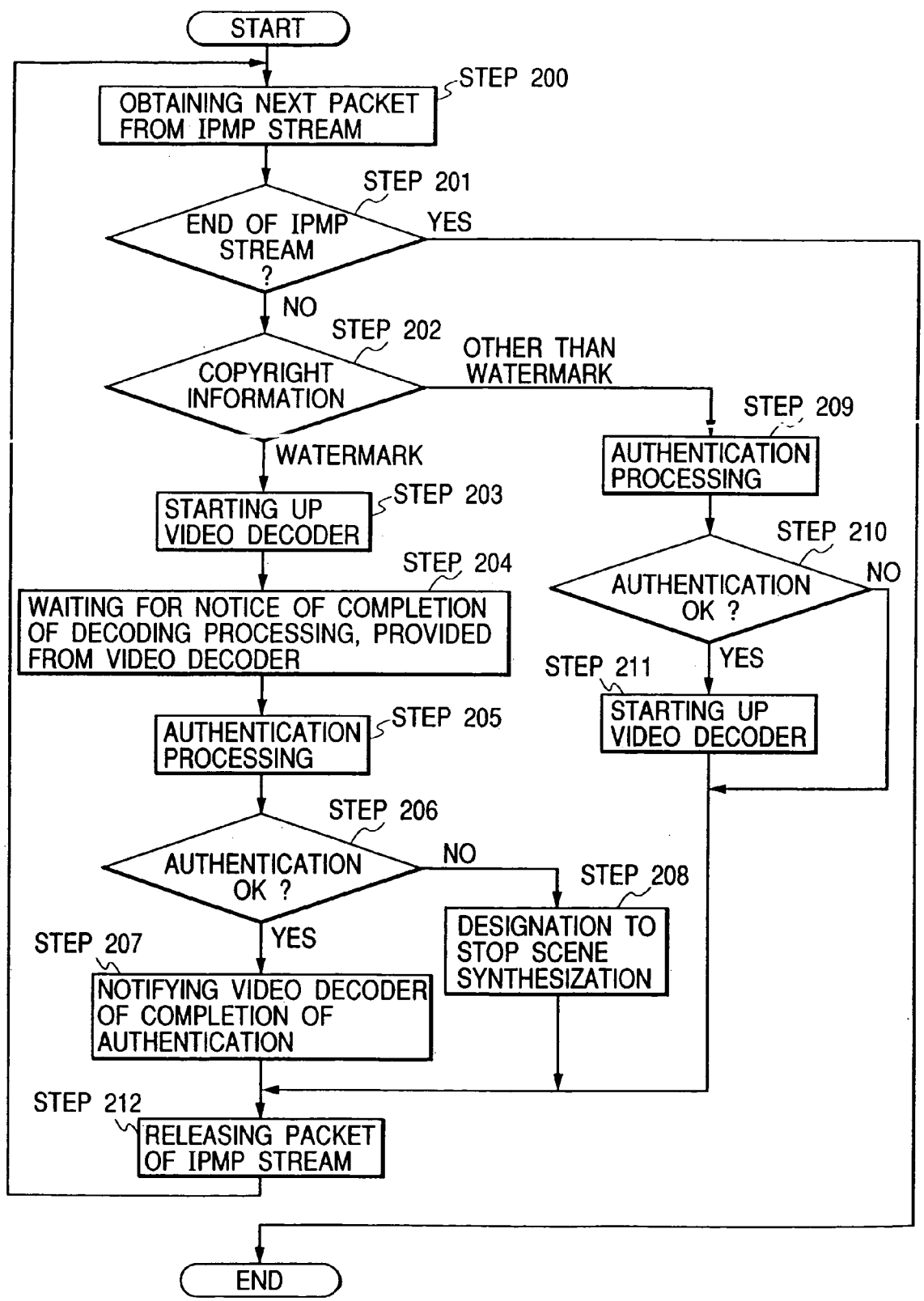
FIG. 3 is a flow chart for explaining the operation of the IPMP control unit 20 according to the embodiment of the present invention.

FIG. 3 is a flow chart for explaining the operation of the IPMP control unit 20 when the MPEG-4 player receives an MPEG-4 bitstream. Assume that the MPEG-4 bitstream is composed of a bitstream of motion image data in units of packets, and a bitstream of IPMP information pertaining to the motion image data, for the sake of simplicity.

In step 200, the next packet is obtained from the bitstream of IPMP information demultiplexed by the demultiplexer 2.

Whether or not the next packet is present is determined in step 201 to check if the stream has reached its end. If YES in step 201, the processing ends; otherwise, the flow advances to step 202.

It is checked in accordance with IPMP information in the obtained packet in step 202 if that IPMP information and copyright information of corresponding motion image data are embedded as a digital watermark in the motion image data.

The IPMP control unit 20 can make this decision by checking the format of the IPMP information.

More specifically, the IPMP information includes a description of the following IPMP object type designation at the beginning of the information. When IPMPS_Type in this description is "0", copyright information is not embedded as a digital watermark; when IPMPS_Type is "1", copyright information is embedded as a digital watermark. This IPMPS_Type is set in advance by the copyright holder or contents sender, and the IPMP control unit determines by identifying IPMPS_Type in the IPMP information if the copyright information of corresponding motion image data is embedded as a digital watermark in that motion image data.

If it is determined in step 202 that the copyright information is embedded as a digital watermark, the flow advances to step 203; otherwise, the flow advances to step 209.

In step 203, a startup notice including a requirement of notice after decoding is sent to the motion image decoding circuit 17 to start up the motion image decoding circuit (or to continue its operation), since the motion image data must be decoded and the copyright information embedded as a digital watermark must be extracted. Then, the flow advances to step 204. In step 204, the control waits for a notice indicating completion of the decoding processing. Upon receiving that notice, the flow advances to step 205.

In step 205, the copyright information embedded as a digital watermark is extracted from the motion image data decoded by the motion image decoding circuit 17, and authentication is done using the extracted copyright information and the IPMP information corresponding to that motion image data.

It is checked in step 206 if authentication has succeeded. If YES in step 206, the control unit notifies the motion image decoding circuit 17 of completion of authentication. On the other hand, if authentication has failed, since a scene must be inhibited from being played back, the flow advances to step 208 to control the access point 26 to stop data supply from the motion image decoding circuit 17 to the scene synthesization circuit 25. In this manner, when authentication has failed, motion image data can be inhibited from being played back.

In step 212, the packet of the stream obtained in step 200 is released, and the flow returns to step 200 to obtain the next packet.

If it is determined in step 202 that the copyright information is not embedded as a digital watermark (i.e., the copyright information is appended by a method other than digital watermarking or no copyright information is appended), the flow advances to step 209.

If the copyright information is appended to the motion image data, authentication is done using the copyright information, and IPMP information corresponding to that motion image data. On the other hand, if no copyright information is appended, authentication is done using the IPMP information alone. It is then checked in step 210 if authentication has succeeded.

If authentication has succeeded, since the motion image data need only be decoded, a startup notice which does not include any requirement of notice after decoding is sent to the motion image decoding circuit 17 to start up the motion image decoding circuit 17 (or to continue its operation) in step 211. The flow then advances to step 212. On the other hand, if authentication has failed, since motion image data need not be decoded, the flow jumps to step 212.

Figure 4:
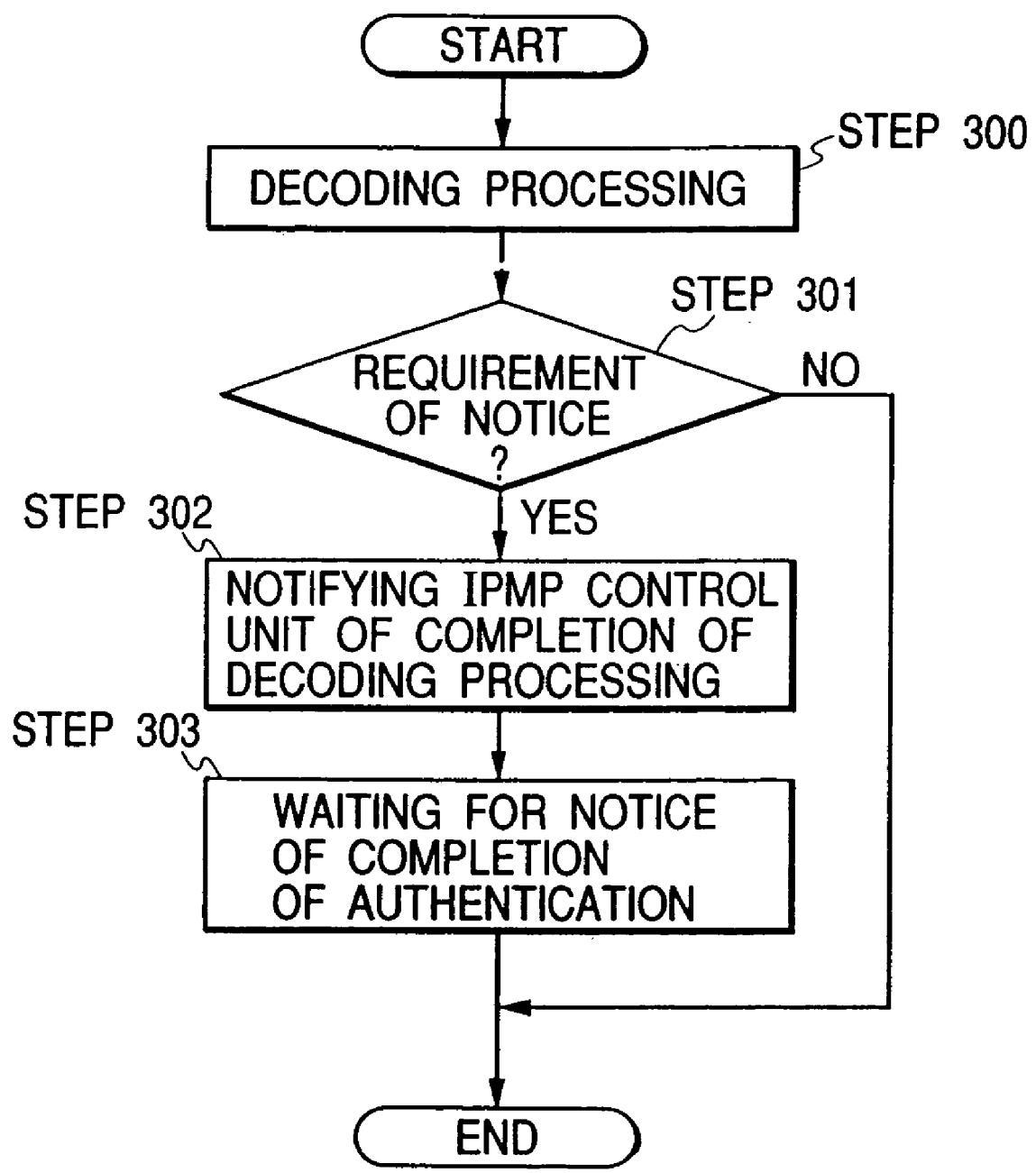
FIG. 4 is a flow chart for explaining the operation of a motion image decoding circuit 17 according to the embodiment of the present invention.

FIG. 4 is a flow chart for explaining the operation of the motion image decoding circuit 17 when the MPEG-4 player receives an MPEG-4 bitstream. Assume that the format of the MPEG-4 bitstream is the same as that in the case of FIG. 3 above.

Upon receiving the startup notice from the IPMP control unit 20, the motion image decoding circuit 17 decodes a packet of a bitstream of motion image data demultiplexed by the demultiplexer 2 in step 300.

Upon completion of decoding of the packet, the flow advances to step 301 to check if the startup notice which is received from the IPMP control unit 20 includes a requirement of notice after decoding.

As has been explained in the description of FIG. 3, when the copyright information of motion image data is embedded as a digital watermark in the motion image data, since authentication must be done after decoding of the motion image data, the startup notice sent from the IPMP control unit 20 to the motion image decoding circuit 17 includes a requirement of notice after decoding. On the other hand, when the copyright information of motion image data is not embedded as a digital watermark in the motion image data (i.e., the copyright information is appended by a method other than digital watermarking or no copyright information is appended), since authentication is complete before decoding of the motion image data, the startup notice sent from the IPMP control unit 20 to the motion image decoding circuit 17 does not include any requirement of notice after decoding.

In this case, if the startup notice received from the IPMP control unit 20 includes a requirement of notice after decoding, the flow advance to step 302; otherwise, the processing ends.

In step 302, the decoding circuit 17 notifies the IPMP control unit 20 of completion of motion image decoding, and the flow advances to step 303. Upon receiving the notice, the IPMP control unit 20 executes authentication in step 205 described above.

In step 303, the decoding circuit 17 waits for a notice of completion of authentication from the IPMP control unit 20. If it is determined in step 206 described in FIG. 3 that authentication has succeeded, since a notice of completion of authentication is issued to the motion image decoding circuit 17 in step 207, a scene synthesis process in the scene synthesization circuit is started in response to that notice of completion of authentication. However, if it is determined in step 206 that authentication has failed, since no notice of completion of authentication is sent to the motion image decoding circuit 17, the operation of the motion image decoding circuit 17 halts.

On the other hand, when means that implement the data processing method according to the present invention are provided in the form of a program, since it is a common practice to process streams of audio object data, motion image object data, IPMP information, and the like in independent threads, synchronization must be taken among these threads. In this embodiment, a mechanism such as known semaphores, event flags, and the like is used to synchronize the threads.

For the purpose of better understanding of the operation of this embodiment, the operations of this embodiment will be conceptually explained below using the timing charts shown in FIGS. 5 and 6.

Figure 5:
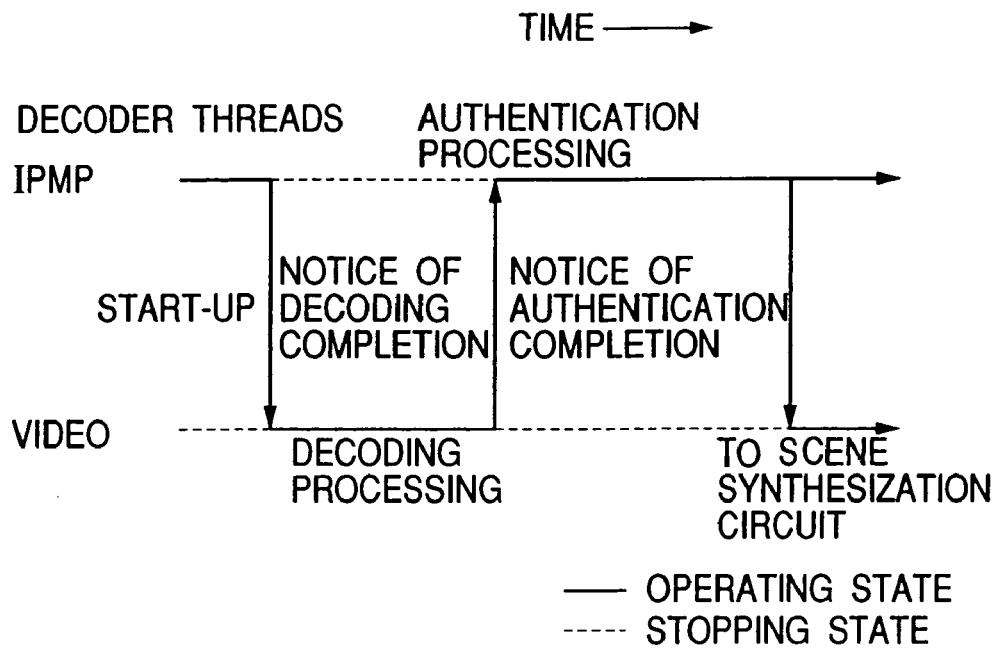
FIG. 5 is a timing chart for explaining the concept of operations upon permitting motion image playback in the processing according to the embodiment of the present invention.

FIG. 5 is a timing chart when authentication using copyright information embedded as a digital watermark in motion image data has succeeded.

In this case, an IPMP thread manages threads for processing data corresponding to IPMP information. Therefore, when IPMP information is appended to a motion image object, the operation of a motion image decoding thread (to be referred to as a video thread hereinafter) is controlled by the IPMP thread.

Upon receiving the IPMP information corresponding to motion image packet data in which copyright information is embedded as a digital watermark, the IPMP thread starts up the video thread, which performs decoding of the motion image data.

Upon completion of decoding, the video thread sends a notice of decoding completion to the IPMP thread.

The IPMP thread executes authentication using the copyright information embedded as a digital watermark, which can be extracted after decoding, and the IPMP information. When authentication has succeeded and playback of that motion image object is permitted, the IPMP thread sends a notice of authentication completion to the video thread. Upon receiving the notice, the video thread restarts operation and supplies decoded motion image data to the scene synthesization circuit, thus allowing to play back the motion image data.

Figure 6:
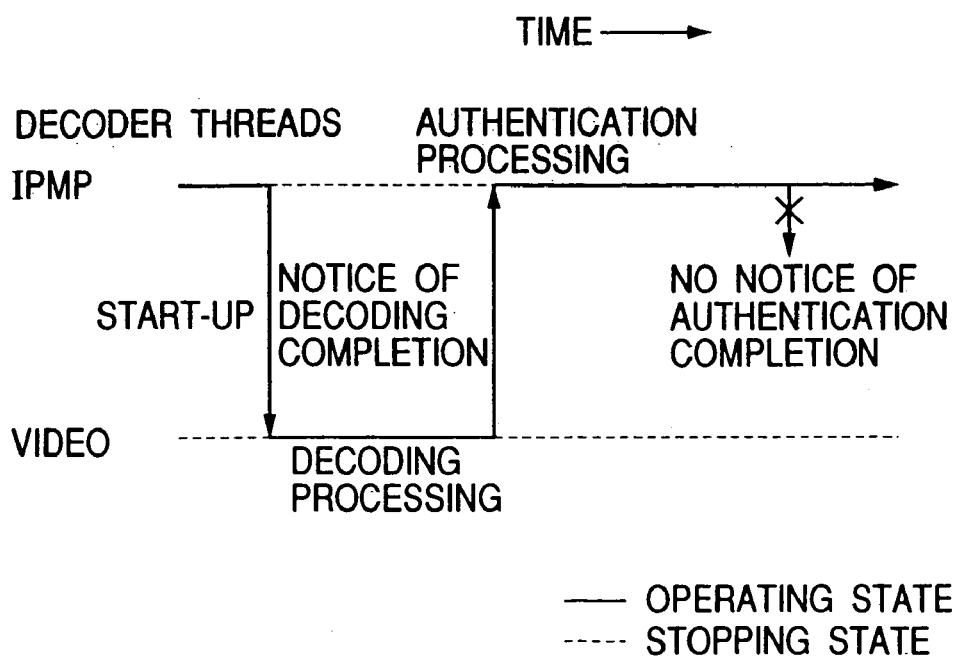
FIG. 6 is a timing chart for conceptually explaining the operations upon inhibiting motion image playback in the processing according to the embodiment of the present invention.

FIG. 6 is a timing chart when authentication using copyright information embedded as a digital watermark in motion image data has failed.

In the timing chart shown in FIG. 6, when the authentication in the IPMP thread has failed and playback of the motion image object is inhibited unlike in FIG. 5, no notice of authentication completion is sent to the video thread, and the video thread stops its operation. The decoded motion image data is not supplied to the scene synthesization circuit, and motion image data is not played back.

In this embodiment, the MPEG-4 bitstream is composed of a bitstream of motion image data in units of packets, and a bitstream of IPMP information pertaining to the motion image data. Also, IPMP information can be appended to respective object data that form the motion image data, and audio data in addition to the motion image data, and a target in which copyright information is embedded as a digital watermark is not limited to motion image data but may be respective object data that form the motion image data, and audio data.

In this embodiment, when authentication has failed, playback of data is inhibited by two methods, i.e., a method of cutting off the access point and a method of stopping the operation of the decoding circuit. Of course, one or both of these methods may be used.

Especially, when only the latter method is used, access points for cutting off streams need not be set. By stopping the operations of the decoding circuits themselves, the decoding circuits 15 to 18 can be prevented from supplying nonsensical data to the scene synthesization circuit 30, power and time savings in the decoding circuits 15 to 18 can be achieved, and operation errors of the scene synthesization circuit can be prevented more reliably.

However, since this method cannot avoid data that have already been decoded by the decoding circuits 15 to 18 from flowing out to the scene synthesization circuit, data playback can be inhibited more reliably by also cutting off streams at the access points.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts. That is, program codes that include modules stored in the external storage device 70 shown in FIG. 2 are stored in the storage medium.

As described above, according to the above embodiment, upon demultiplexing and playing back object streams from a datastream that contains a plurality of object streams each having predetermined information, playback control of object data protected by copyright information can be done not only before decoding of the data but also after decoding, and more flexible copyright authentication can be achieved.

Especially, whether or not playback control of the object data is done before or after decoding of the data can be determined based on if copyright information is embedded in the object data as a digital watermark.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing method, comprising:

an input step, of inputting information data and management data for managing intellectual property with respect to the information data, the information data being encoded;

a decoding step, of decoding the information data inputted in the input step;

a reproducing step, of reproducing decoded information data decoded in the decoding step;

a judgment step, of judging, based on the management data, whether an intellectual property management type of the information data is a first intellectual property management type or a second intellectual property management type, wherein the information data of the first intellectual property management type includes first authentication data and the information data is authenticatable using the first authentication data after being decoded,
wherein the information data of the second intellectual property management type excludes the first authentication data, which is usable for authentication after the information data is decoded, and includes second authentication data, the information data being authenticatable using the second authentication data without being decoded; and
an authentication step:
in a case where the intellectual property management type of the information data is judged as the first intellectual property management type in the judgment step:
of outputting to the decoding step a first startup notice for starting the decoding step to decode the information data and a request for notice that decoding the information data is completed, and, when the notice is received,
of executing an authentication process for the information data, and,
in a case where the intellectual property management type of the information data is judged as the second intellectual property management type in the judgment step:
of executing the authentication process for the information data, and, when the authentication process succeeds,
of outputting to the decoding step a second startup notice for starting the decoding step to decode the information data and excluding the request for the notice that decoding the information data is completed, and
when the authentication process fails, the decoding step is not performed,
wherein, when the decoding step receives the first startup notice, the decoding step does not output the decoded information data to the reproducing step until an authentication result from the authentication step indicating that the authentication process has succeeded is received, and when the decoding step receives the second startup notice, the decoding step outputs the decoded information data to the reproducing step when the decoding process of the information data is completed, and at least one of the steps is performed by at least one computer processor.

2. An information processing apparatus, comprising:
an input unit, configured to input information data and management data for managing intellectual property with respect to the information data, the information data being encoded;
a decoding unit, configured to decode the information data inputted by the input unit;
a reproducing unit configured to reproduce decoded information data decoded by the decoding unit;
a judgment unit, configured to judge, based on the management data, whether an intellectual property management type of the information data is a first intellectual property management type or a second intellectual property management type,
wherein the information data of the first intellectual property management type includes first authentication data and the information data is authenticatable using the first authentication data after being decoded, and
wherein the information data of the second intellectual property management type excludes the first authentication data, which is usable for authentication of the information data after being decoded, and includes second authentication data, the information data being authenticatable using the second authentication data without being decoded; and
an authentication unit, configured to:
in a case where the intellectual property management type of the information data is judged as the first intellectual property management type by the judgment unit:
output to the decoding unit a first startup notice for starting the decoding unit to decode the information data and a request for a notice that decoding the information data is completed, and, when the notice is received,
execute an authentication process for the information data, and
in a case where the intellectual property management type of the information data is judged as the second intellectual property management type by the judgment unit:
execute the authentication process for the information data, and, when the authentication process has succeeded,
output to the decoding unit a second startup notice for starting the decoding unit to decode the information data that excludes the request for the notice that the decoding the information data is completed, and
when the authentication process fails, the decoding step is not performed,
wherein, when the decoding unit receives the first startup notice, the decoding unit does not output the decoded information data to the reproducing unit until an authentication result from the authentication unit indicating that the authentication process has succeeded is received, and
wherein, when the decoding unit receives the second startup notice, the decoding unit outputs the decoded information data to the reproducing unit when the decoding proceeds of the information data is completed, and at least one of the units is formed by at least one computer processor.

3. A non-transitory computer readable storage medium which stores a program that, when executed by a computer, causes the computer to perform an information processing method comprising:
an input step, of inputting information data and management data for managing intellectual property with respect to the information data, wherein the information data is encoded;
a decoding step, of decoding the information data inputted in the input step;
a reproducing step, of reproducing decoded information data decoded in the decoding step;
a judgment step, of judging, based on the management data, whether an intellectual property management type of the information data is a first intellectual property management type or a second intellectual property management type,
wherein the information data of the first intellectual property management type includes first authentication data, the information data being authenticatable using the first authentication data after being decoded, and
wherein the information data of the second intellectual property management type excludes the first authentication data, which is usable for authentication after being decoded, and includes second authentication data, the information data being authenticatable using the second authentication data without being decoded; and an authentication step:

in a case where the intellectual property management type of the information data is judged as the first intellectual property management type in the judgment step:

of outputting to the decoding step a first startup notice for starting the decoding step to decode the information data and a request for a notice that decoding the information data is completed, and, when the notice is received, of executing an authentication process for each of the plural objects included in the information data, and in a case where the intellectual property management type of the information data is judged as the second intellectual property management type in the judgment step:

of executing the authentication process for the information data, and, when the authentication process succeeds, of outputting to the decoding step a second startup notice for starting the decoding step to decode the information data and excluding the request for the notice that decoding the information data is completed, and when the authentication process fails, the decoding step is not performed, wherein, when the decoding step receives the first startup notice, the decoding step does not output the decoded information data to the reproducing step until an authentication result from the authentication step indicating that the authentication process is succeeded is received, and wherein, when the decoding step receives the second startup notice, the decoding step outputs the decoded information data to the reproducing step when the decoding process of the information data is completed.

* * * * *